US010862677B2

(12) United States Patent
Bitauld (10) Patent No.: US 10,862,677 B2
(45) Date of Patent: Dec. 8, 2020

(54) DUAL RAIL COMPENSATION IN PHASE ENCODED COMMUNICATION

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 233 days.

(21) Appl. No.: 15/764,479

(22) PCT Filed: Oct. 2, 2015

(86) PCT No.: PCT/FI2015/050660
§ 371 (c)(1),
(2) Date: Mar. 29, 2018

(87) PCT Pub. No.: WO2017/055677
PCT Pub. Date: Apr. 6, 2017

(65) Prior Publication Data
US 2018/0294960 A1    Oct. 11, 2018

(51) Int. Cl.
*H04L 9/08* (2006.01)
*H04B 10/548* (2013.01)
*H04J 14/06* (2006.01)
*H04B 10/70* (2013.01)

(52) U.S. Cl.
CPC ......... *H04L 9/0852* (2013.01); *H04B 10/548* (2013.01); *H04B 10/70* (2013.01); *H04J 14/06* (2013.01); *H04L 9/0858* (2013.01)

(58) Field of Classification Search
CPC ....... H04L 9/0852; H04L 9/0858; H04L 9/08; H04B 10/548; H04B 10/70; H04J 14/06
See application file for complete search history.

(56) References Cited

U.S. PATENT DOCUMENTS 6,538,787 B1    3/2003  Moeller et al.
8,175,171 B2 *  5/2012  Karaki .............. H04L 1/0079
                                             375/257

(Continued)

FOREIGN PATENT DOCUMENTS

CN      104579564 A     4/2015
EP        1936841 A2    6/2008
(Continued)

OTHER PUBLICATIONS

Trasischker et al., "Single Input State Polarization Sensitive Swept Source Optical Coherence Tomography Based on an All Single Mode Fiber Interferometer", Biomedical Optics Express, vol. 5, No. 8, 2014, pp. 2798-2809.

(Continued)

Primary Examiner — Jayesh M Jhaveri
(74) Attorney, Agent, or Firm — Harrington & Smith (57) ABSTRACT

According to an example aspect of the present invention, there is provided an apparatus comprising a phase modulator configured to modify a phase of light incoming into the phase modulator, to generate phase-encoded light, a dual rail encoder configured to modify the phase-encoded light in dependence of a control signal, to thereby impart a polarization rotation compensation into the phase-encoded light, and a polarization rotator combiner coupled to the dual rail encoder, configured to convert dual rail light from the dual rail encoder into polarization encoded light, wherein the apparatus is arranged to transmit the polarization encoded light.

20 Claims, 11 Drawing Sheets (56) References Cited

U.S. PATENT DOCUMENTS

| | | | |
|---|---|---|---|
| 2004/0151321 A1 | 8/2004 | Lutkenhaus | |
| 2006/0262930 A1 | 11/2006 | Dinu et al. | |
| 2007/0182968 A1 | 8/2007 | Nishioka et al. | |
| 2008/0037998 A1 | 2/2008 | Zhengfu et al. | |
| 2009/0041243 A1* | 2/2009 | Nambu | H04L 9/0858 380/256 |
| 2015/0249537 A1* | 9/2015 | Wabnig | H04L 9/0858 380/256 |
| 2015/0354938 A1* | 12/2015 | Mower | G06N 10/00 356/477 |

FOREIGN PATENT DOCUMENTS

| | | | | |
|---|---|---|---|---|
| JP | 2008160368 A | 7/2008 | | |
| WO | 2013179094 | 12/2013 | | |
| WO | WO-2013179094 A1 * | 12/2013 | ............. | H04B 10/70 |
| WO | 2014060793 | 4/2014 | | |
| WO | 2015092479 | 6/2015 | | |
| WO | WO-2015092479 A1 * | 6/2015 | ............. | G02F 1/353 |
| WO | 2015/189456 A1 | 12/2015 | | |
| WO | 2017/055677 A1 | 4/2017 | | |

OTHER PUBLICATIONS

Extended European Search Report received for corresponding European Patent Application No. 15905277.8, dated Mar. 28, 2019, 8 pages.

International Search Report and Written Opinion received for corresponding Patent Cooperation Treaty Application No. PCT/FI2015/050660, dated Jan. 29, 2016, 13 pages.

* cited by examiner

DUAL RAIL COMPENSATION IN PHASE ENCODED COMMUNICATION

RELATED APPLICATION

This application was originally filed as PCT Application No. PCT/FI2015/050660 filed Oct. 2, 2015.

FIELD

The present invention relates to the field of optical communication, for example quantum key distribution using low intensity optical pulses.

BACKGROUND

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

In quantum communication, QC, two parties may exchange information encoded in quantum states. The quantum states, or qubits, may comprise specially defined properties of photons such as pairs of polarization states, such as 0° and 90°, or circular basis states such as left-handedness and right-handedness. Through quantum communication, the two parties may produce a shared random series of bits known only to them, which can then be used as secret keys in subsequent encryption and decryption of messages. A third party can, in theory, eavesdrop on the QC between the two parties. Such eavesdropping perturbs the QC, however, introducing anomalies that the two intended parties can detect. The two parties may post-process the results of the QC to remove any partial information acquired by an eavesdropper, and form shared secret keys from the remaining information resulting from the QC. The quantum states may comprise phase encoded states.

An eavesdropper intercepting and re-transmitting a photon comprised in a quantum communication can only guess the original sending basis when it re-encodes and re-transmits the photon toward its original destination. The receiver may detect the eavesdropping since for subsets of bit values for which sending basis and measuring basis are found to match, parity values should match exactly, assuming the communication system is well tuned and free from imperfections in transmission and reception. Discrepancies in bit values introduced by eavesdropping enable the transmitter and receiver to detect eavesdropping and correct the secret keys.

SUMMARY OF THE INVENTION

The invention is defined by the features of the independent claims. Some specific embodiments are defined in the dependent claims.

According to a first aspect of the present invention, there is provided an apparatus comprising a phase modulator configured to modify a phase of light incoming into the phase modulator, to generate phase-encoded light, a dual rail encoder configured to modify the phase-encoded light in dependence of a control signal, to thereby impart a polarization rotation compensation into the phase-encoded light, and a polarization rotator combiner coupled to the dual rail encoder, configured to convert dual rail light from the dual rail encoder into polarization encoded light, wherein the apparatus is arranged to transmit the polarization encoded light.

According to a second aspect of the present invention, there is provided an apparatus, comprising a polarization splitter rotator configured to convert polarization encoded light incoming into the apparatus into dual rail light, and an optical receiver configured to receive the dual rail light, at least in part, and to determine a bit sequence phase encoded into the dual rail light, wherein the apparatus is configured to generate feedback data relating to polarization rotation based on the dual rail light.

According to a third aspect of the present invention, there is provided a method comprising modifying a phase of light in a phase modulator, to generate phase-encoded light, modifying, in dual rail form, the phase-encoded light in dependence of a control signal, to thereby impart a polarization rotation compensation into the phase-encoded light, converting the dual rail light into polarization encoded light, and transmitting the polarization encoded light.

According to a fourth aspect of the present invention, there is provided a method, comprising converting polarization encoded light incoming into an apparatus into dual rail light, receiving the dual rail light, at least in part, and determining a bit sequence phase encoded into the dual rail light, and generating feedback data relating to polarization rotation based on the dual rail light.

According to a fifth aspect of the present invention, there is provided an apparatus comprising means for modifying a phase of light in a phase modulator, to generate phase-encoded light, means for modifying the phase-encoded light in dependence of a control signal, to thereby impart a polarization rotation compensation into the phase-encoded light and to obtain dual rail light from the phase-encoded light, means for converting the dual rail light into polarization encoded light, and means for transmitting the polarization encoded light.

According to a sixth aspect of the present invention, there is provided an apparatus, comprising means for converting polarization encoded light incoming into an apparatus into dual rail light, means for receiving the dual rail light, at least in part, and determining a bit sequence phase encoded into the dual rail light, and means for generating feedback data relating to polarization rotation based on the dual rail light.

According to a seventh aspect of the present invention, there is provided a non-transitory computer readable medium having stored thereon a set of computer readable instructions that, when executed by at least one processor, cause an apparatus to at least modify a phase of light in a phase modulator, to generate phase-encoded light, modify the phase-encoded light in dependence of a control signal, to thereby impart a polarization rotation compensation into the phase-encoded light and to obtain dual rail light from the phase-encoded light, convert the dual rail light into polarization encoded light, and transmit the polarization encoded light.

According to a eighth aspect of the present invention, there is provided a non-transitory computer readable medium having stored thereon a set of computer readable instructions that, when executed by at least one processor, cause an apparatus to at least convert polarization encoded light incoming into an apparatus into dual rail light, receive the dual rail light, at least in part, and determining a bit sequence phase encoded into the dual rail light, and generate feedback data relating to polarization rotation based on the dual rail light.

According to a ninth aspect of the present invention, there is provided a computer program configured to cause a method in accordance with at least one of the third and fourth aspects to be performed.

EMBODIMENTS

In quantum key distribution, QKD, or indeed other optical communication, dual rail compensation for polarization rotations incurred in a transmission medium that does not conserve polarization may be beneficial where the communication is phase-encoded. As receivers may be polarization dependent, and as some protocols use polarization multiplexing between qubit states |0> and |1>, or between a QKD signal and a reference signal, receiving an optical signal in a correct polarization state in a receiver is of benefit. Dual rail may comprise, general, processing light in two arms, or waveguides, such that delay between the arms is much smaller than time used to communicate one bit.

Polarization control may be performed by straining a fibre or in free space, for example. A drawback with those solutions is that they are bulky to implement. Compensating for polarization rotations in dual rail, as in the present invention, enables a more compact on-chip implementation. Compensating for polarization rotations in dual rail may comprise, in general, adjusting a phase difference and relative amplitudes of the two rails.

Figure 1:
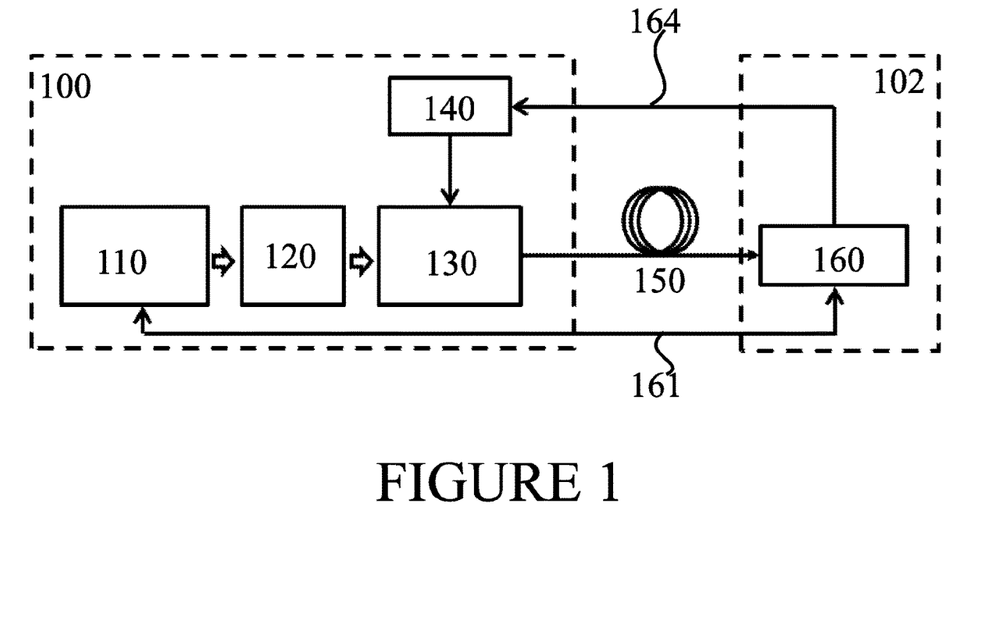
FIG. 1 illustrates an example system in accordance with at least some embodiments of the present invention.

FIG. 1 illustrates an example system in accordance with at least some embodiments of the present invention. The system may be employed in the context of time bin-phase encoding or distributed phase protocols, for example. The system comprises emitter 100 and receiver 102.

Emitter 100 comprises a phase modulator 110, which may be employed to generate, by phase encoding, for example, a phase-encoded signal. The signal may be a QKD optical signal, for example. Phase encoding may, in general, comprise modifying a phase of light, or modifying phase and amplitude of light. The phase-encoded signal may comprise, for example, weak coherent pulses encoded in the relative phase and amplitude of two time bins using a suitable protocol. Examples of such protocols include BB84 or SARG04, distributed phase protocols such as COW and DPS, and CV-QKD protocols with a time multiplexed reference signal. Phase randomization may be employed between successive qubits except in distributed phase protocols where coherence between successive qubits is required.

Attenuator 120 may be arranged to attenuate the phase-encoded light into weak pulses, after which the light may be conveyed to dual rail encoder 130. Dual rail encoder 130 may be configured to pre-compensate for polarization rotations that the light will undergo while conveyed over fibre 150 on its way to receiver 102. The pre-compensation may be performed when the light is in the dual rail encoder in dual rail form. This way, light arriving in receiver 102 will be more optimally aligned for reception. To facilitate determining what the correct pre-compensation is, dual rail encoder 130 may receive a control signal from controller 140, which in turn may be arranged to receive feedback data via classical connection 164 with the receiver. The feedback data and control signal may characterise the rotations incurred in fibre 150, thus enabling their pre-compensation in dual rail encoder 130. In some embodiments, attenuator 120 may be placed in another location in the chain of emitter 100, for example before phase modulator 110, or after dual rail encoder 130. Light may be converted from dual rail form to polarization encoded form prior to emission from emitter 100 toward receiver 102.

Subsequent to the light traversing fibre 150, it is conveyed into receiver 102 for reception in detector 160, which may comprise, for example, a polarization dependent receiver. Therefore, it may be beneficial that the polarization of the incoming light is aligned correctly with detector 160, by correctly pre-compensating in the emitter for polarization rotation incurred in fibre 150. Detector 160 may perform interferometric operations to decode the light. The output data may be used to extract a raw key, to perform error correction and/or to measure security parameters relating to calculating how much privacy amplification is needed, for example.

Fibre 150 may comprise a single mode fibre, for example. In some embodiments, the transmission medium is not a fibre but another transmission medium, which may be polarization non-conserving. A classical channel 161 may be employed for supporting a QKD protocol that is used.

While FIG. 1 illustrates a general form of at least some embodiments of the present invention, more specific embodiments are laid out in FIGS. 2-11. These more specific embodiments may be combinable, where reasonable, with each other as well as with the embodiments of FIG. 1. In general, embodiments of the present invention comprising compensating for polarization rotation in dual rail may enable more compact implementations, such as indium phosphide, InP or silicon-on-insulator, SoI implementations. Such compact, on-chip implementations may be faster and more stable than bulkier alternatives not using embodiments of the present invention. Enabling use of InP or SoI is also a technical advantage in itself, since these technologies enable integrated photonics platforms.

Figure 2:
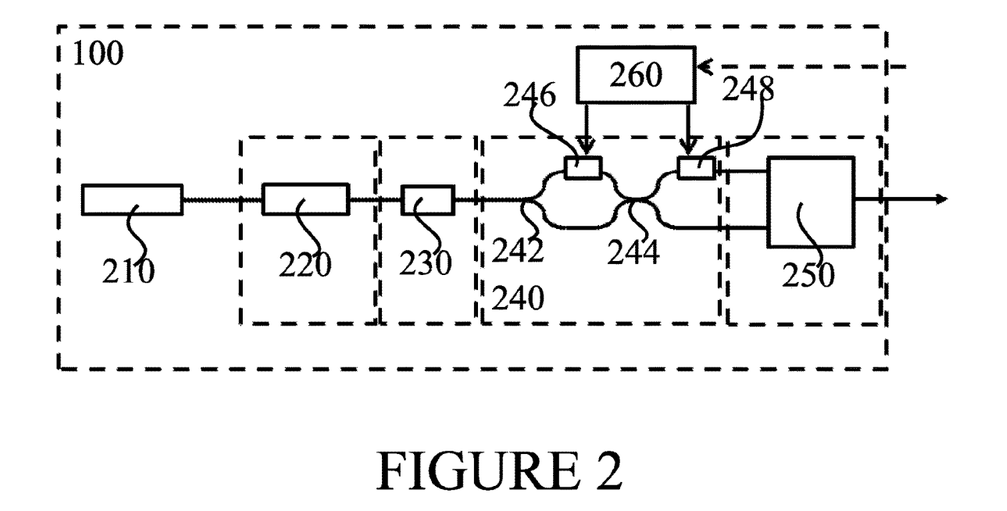
FIG. 2 illustrates an example emitter in accordance with at least some embodiments of the present invention.

FIG. 2 illustrates an example emitter 100 in accordance with at least some embodiments of the present invention. The emitter 100 of FIG. 2 may be an implementation of emitter 100 of FIG. 1, for example. The emitter of FIG. 2 may be implemented using InP technology, for example.

A light source 210 may comprise a laser, for example a continuous wave laser. Light from source 210 may be conveyed, using a suitable waveguide, to phase modulator 220, which may be configured to phase and/or amplitude modulate the light. Phase modulator 220 may further be configured to phase randomize the light from source 210. Output from phase modulator 220 is phase-encoded light. The phase-encoded light is conveyed to attenuator 230, which may be arranged to attenuate the phase-encoded light into weak pulses, after which the light may be conveyed to dual rail encoder 240. As laid out above, attenuator 230 may be placed in different stages of the sequence than what is illustrated in FIG. 2.

Dual rail encoder 240 comprises 1×2 coupler 242, 2×2 coupler 244 and phase shifters 246 and 248. Phase shifters 246 and 248 may be configurable by a control signal from controller 260 to impart the polarization rotation pre-compensation to the light when the light is in dual rail form in dual rail encoder 240.

Polarization rotator combiner, PRC, 250 is configured to receive dual rail light from dual rail encoder 140 and to convert it into polarization encoded form before conveying it from emitter 100 toward the receiver.

Figure 3A:
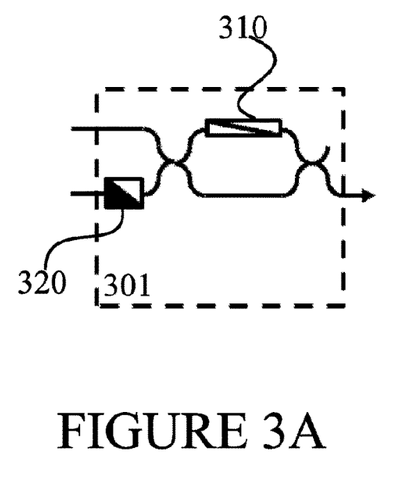
FIG. 3A illustrates an example of a polarization rotator combiner, PRC, with InP technology.

FIG. 3A illustrates an example of a polarization rotator combiner, PRC, with InP technology. PRC 301 comprises a birefringent waveguide 310, and a polarization rotator 320.

Figure 3B:
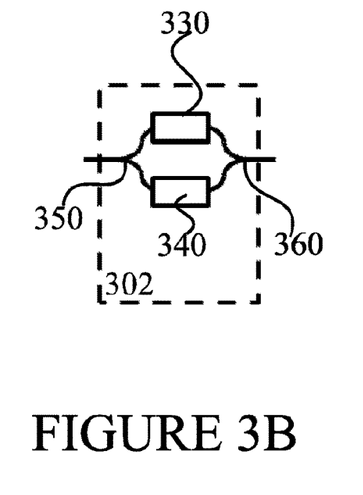
FIG. 3B illustrates an example of an amplitude modulator in accordance with at least some embodiments of the present invention.

FIG. 3B illustrates an example of an amplitude modulator. The amplitude modulator 302 comprises 1×2 couplers 350 and 360. The amplitude modulator 302 further comprises phase shifters 330 and 340, to which voltage modulation, a+ or a−, may be applied. Amplitude modulator 302 may be based on a Mach-Zehnder interferometer, MZI, for example.

Figure 4A:
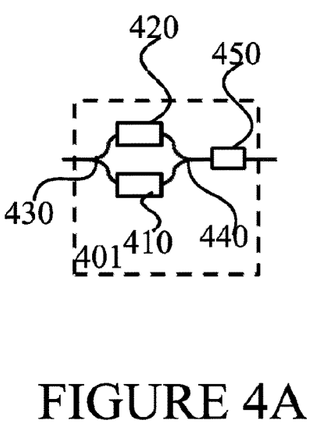
FIG. 4A illustrates an example of an amplitude and phase modulator in accordance with at least some embodiments of the present invention.

FIG. 4A illustrates an example of an amplitude and phase modulator. Amplitude and phase modulator 401 comprises 1×2 couplers 430 and 440, phase shifters 410 and 420, and phase modulator 450. Elements 410, 420, 430 and 440 together may correspond to the MZI of FIG. 3B.

Figure 4B:
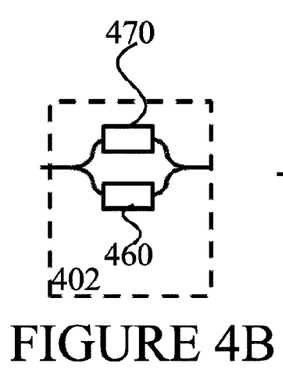
FIG. 4B illustrates an example of an MZI modulator in accordance with at least some embodiments of the present invention.

FIG. 4B illustrates an example of an MZI modulator 402. This MZI modulator has construction similar to that illustrated in FIG. 3B, but an overall phase modulation is created by adding voltage, of the same sign, to both phase shifters 460 and 470. 1×2 couplers are present on either side of phase shifters 460 and 470, as in FIG. 3B, although not labelled separately in FIG. 4B.

Figure 4C:
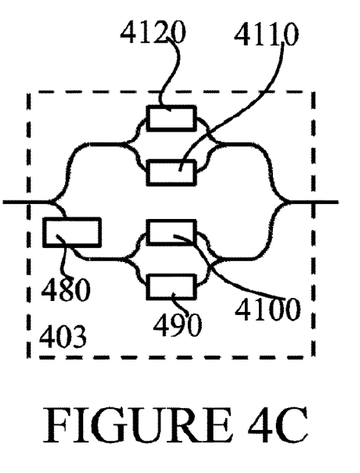
FIG. 4C illustrates an example of a dual MZI modulator in accordance with at least some embodiments of the present invention.

FIG. 4C illustrates an example of a dual MZI modulator 403. In this architecture, amplitude of each quadrature of the signal is modulated separately, using phase shifters 480, 490, 4100, 4110 and 4120. Phase shifter 480 is configured to impart a pi/2 shift.

Figure 5A:
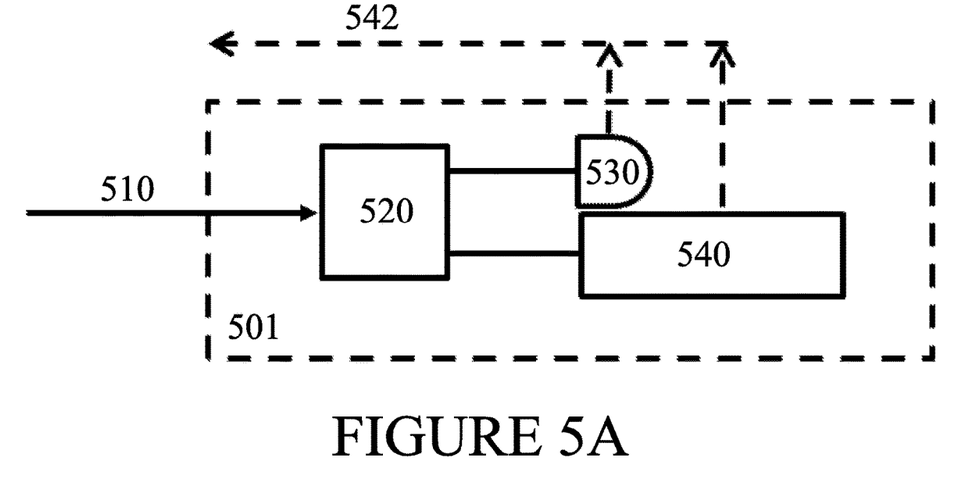
FIG. 5A illustrates an example of a receiver architecture in accordance with at least some embodiments of the present invention.

FIG. 5A illustrates an example receiver architecture. Receiver 501 comprises an input 510 arranged to receive light incoming via a fibre or other medium. The input is coupled to a polarization beam splitter, PBS, 520, which is configured to convey light polarized perpendicular to the optimal polarization toward detector 530. Minimizing the signal seen by detector 530 provides good feedback data 542 for the emitter side to tune the polarization rotation pre-compensation. PBS 520 conveys optimally polarized light to polarization dependent QKD receiver 540, which is used to detect actual payload data encoded into the incoming light. QKD receiver 540 may also provide, at least partially, feedback data 542 toward the emitter.

Figure 5B:
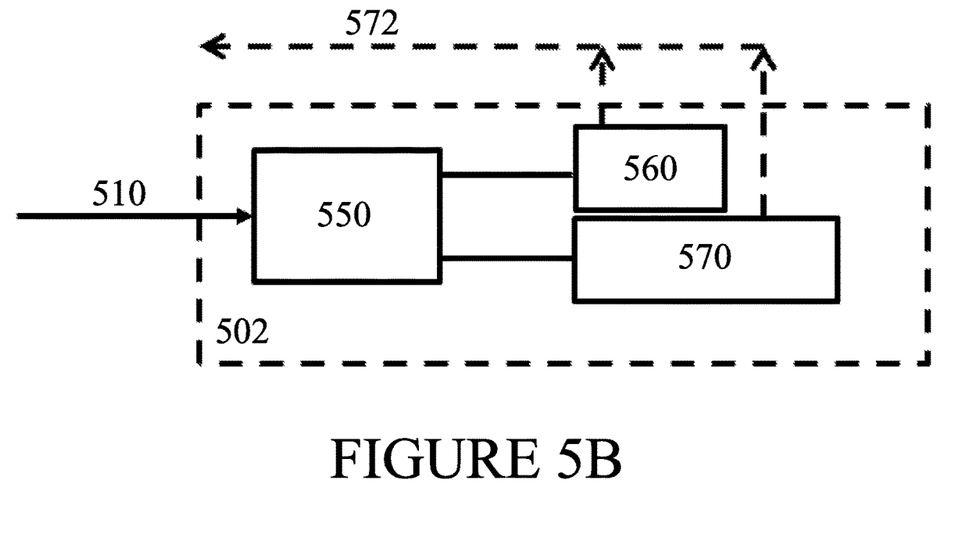
FIG. 5B illustrates an example of receiver architecture in accordance with at least some embodiments of the present invention.

FIG. 5B illustrates an example of receiver architecture. The architecture of FIG. 5B resembles that of FIG. 5A. In FIG. 5B, input 510 conveys light to polarization independent splitter or switch 550, which in turn conveys part of the light to polarization analyser 560 and the rest to polarization dependent QKD receiver 570. If there is a known relation between the polarization at the QKD receiver 570 and the polarization analyzer 560, for example, the same polarization or a calibrated polarization relation, the adjustment that needs to be done in the pre-compensation stage at the emitter is known immediately and may be communicated as feedback data 572. In order to have more accurate polarization measurements and not using single photon detectors for the analyzer, it may be useful that the emitter occasionally sends non-attenuated pulses with at least one defined polarization. Non-attenuated pulses may be used for such a purpose generally in other embodiments as well, and not only the embodiments of FIG. 5B.

Figure 6:
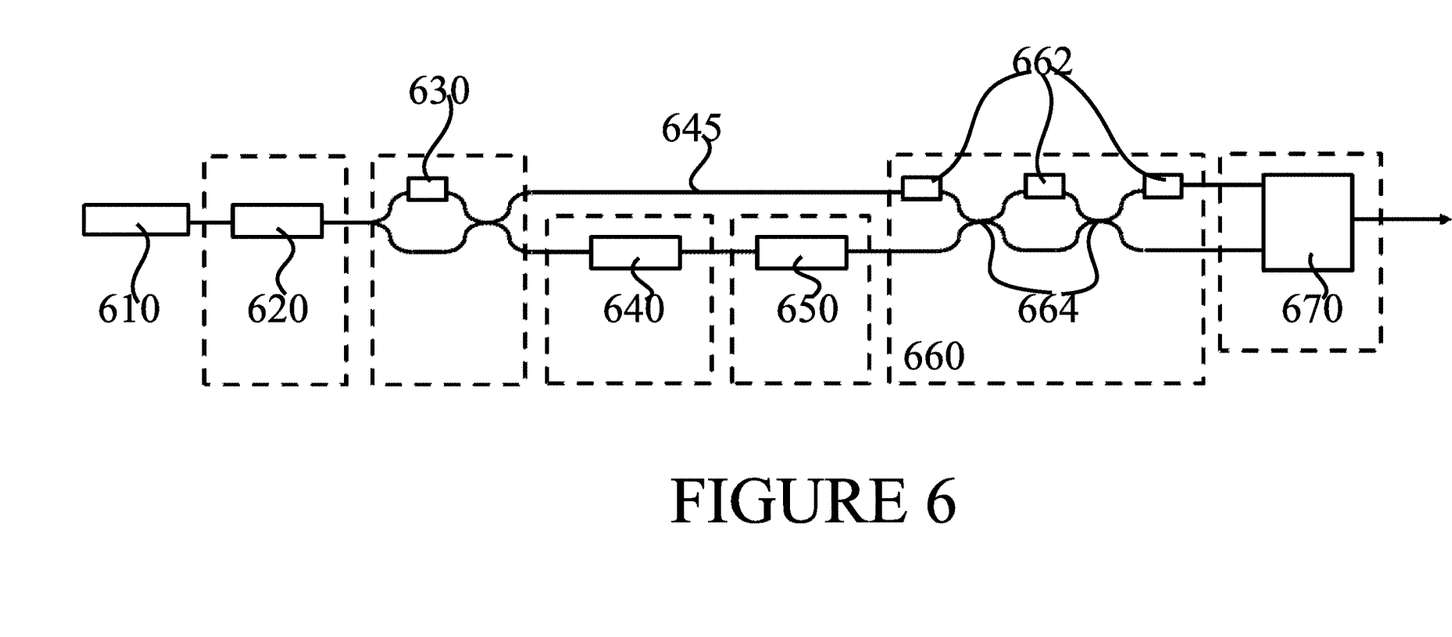
FIG. 6 illustrates an example emitter architecture supporting polarization multiplexing in accordance with at least some embodiments of the present invention.

FIG. 6 illustrates an example emitter architecture supporting polarization multiplexing. In this architecture, a reference signal is time and polarization multiplexed with a QKD signal. This means that the reference signal is sent in a different time slot with a different polarization. A protocol capable is operating this way is CV-QKD. A light source 610 provides light to pulse modulator 620. Pulse modulated light is provided to a switch stage, which comprises switch 630. Switch 630 performs time multiplexing by alternatingly providing the pulse modulated light to a first one of the two dual rail encoder rails as a reference signal 645 and to an amplitude and phase modulator 640. Phase-encoded light from amplitude and phase modulator 640 is conveyed, via attenuator 650, to the other one of the two dual rail encoder rails. Pre-compensation is performed in dual rail encoder 660, as laid out above. The dual rail encoder 660 comprises two 2×2 couplers 664 and three phase shifters 662. Dual rail light output by dual rail encoder 660 is converted to polarization encoded light in PRC 670.

Figure 7:
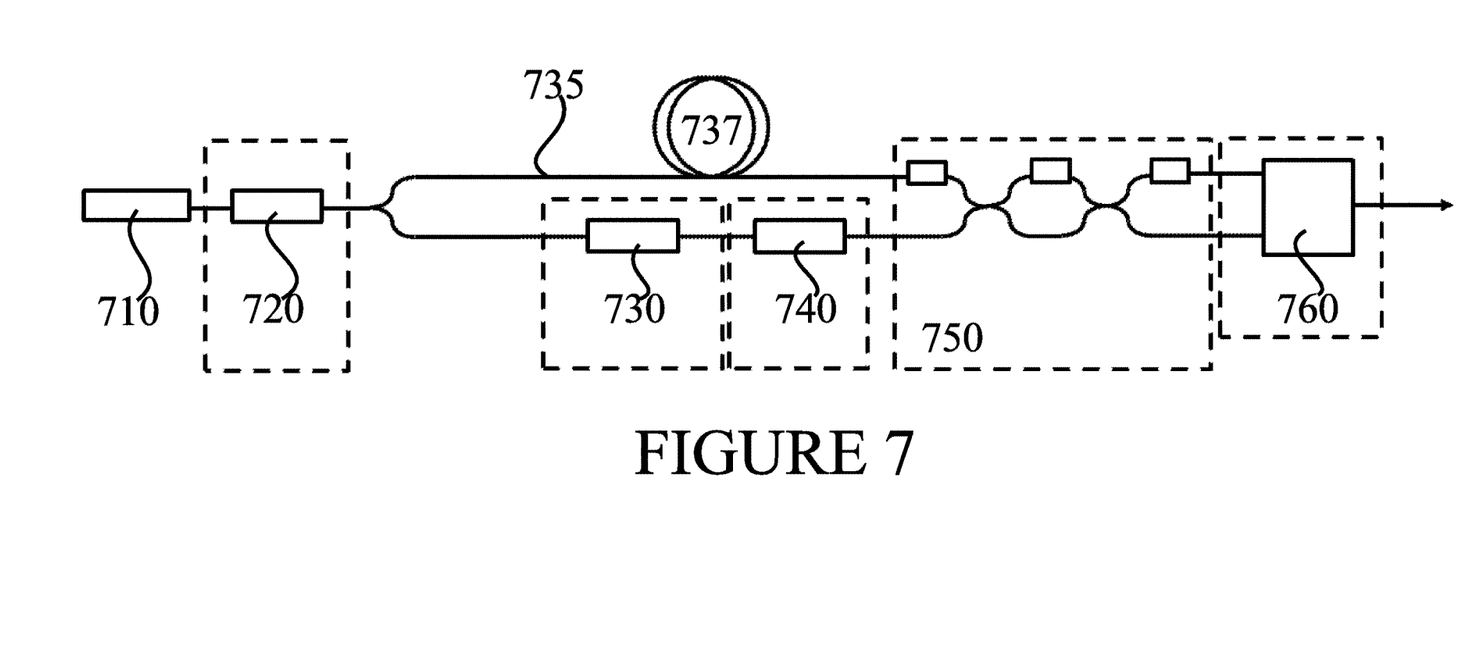
FIG. 7 illustrates an example emitter architecture supporting polarization multiplexing in accordance with at least some embodiments of the present invention.

FIG. 7 illustrates an example emitter architecture supporting polarization multiplexing. As in the system of FIG. 6, a reference signal is time and polarization multiplexed with a QKD signal. A light source 710 provides light to pulse modulator 720. From the pulse modulator 720, light is split simultaneously to the reference arm 735, and to a QKD arm which comprises amplitude and phase modulator 730 and attenuator 740. The reference arm is optically coupled to a first dual rail encoder rail via delay line 737, and the QKD arm is optically coupled to a second dual rail encoder rail. Delaying in delay line 737 performs the multiplexing. The dual rail encoder 750 may be similar in construction to dual rail encoder 660 of FIG. 6. Pre-compensation is performed in dual rail encoder 750. Dual rail light output by dual rail encoder 750 is converted to polarization encoded light in PRC 760 prior to emitting the light from the emitter.

Figure 8:
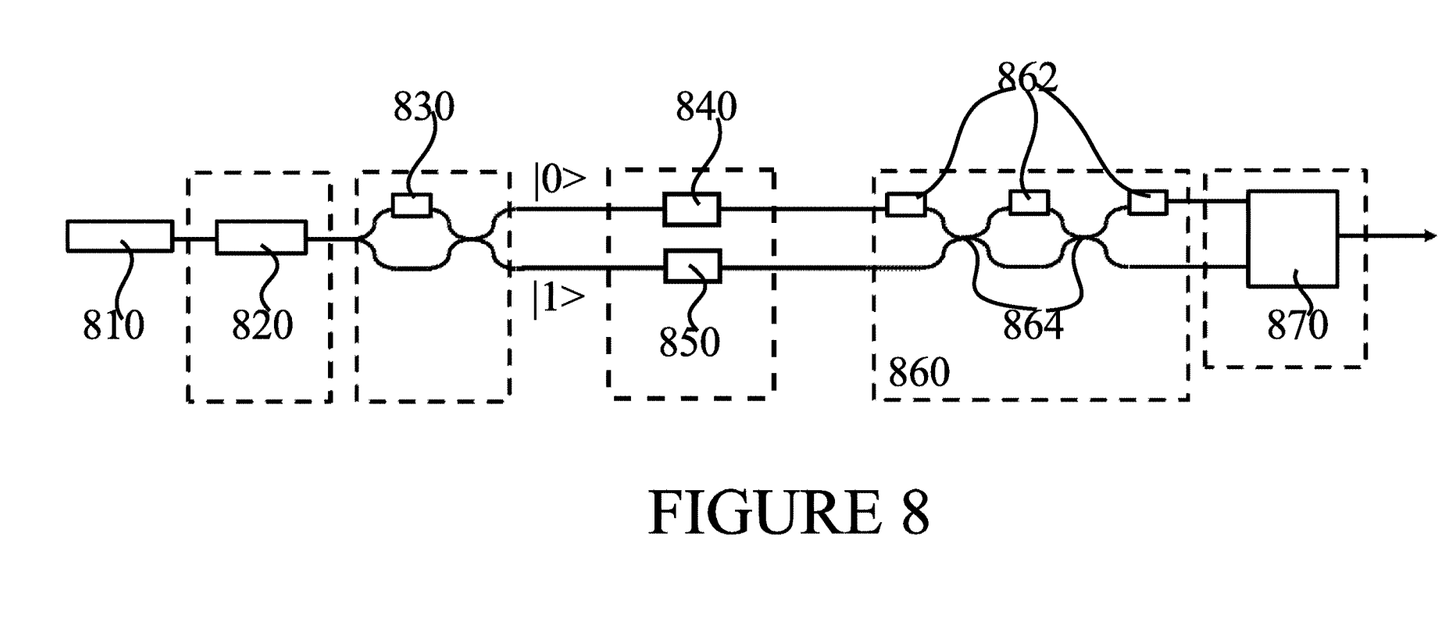
FIG. 8 illustrates an example emitter architecture supporting time bin encoding in accordance with at least some embodiments of the present invention.

FIG. 8 illustrates an example emitter architecture supporting time bin encoding. A light source 810 provides light to pulse modulator 820. Pulse modulator 820 may provide pulse modulation, and at least one of variable attenuation and phase randomization. A switch 830 directs the pulse modulated light alternatingly to a state |0> arm and to a state |1> arm. The amplitude is modulated in each arm and the phase difference is encoded by applying a phase modulation in at least one of the two arms. This may be achieved by phase and/or amplitude encoders 840 and 850. Each of the two arms couples optically to one rail of dual rail encoder 860. Dual rail encoder 860 comprises phase shifters 862 and 2×2 couplers 864. Dual rail light output by dual rail encoder 860 is converted to polarization encoded light in PRC 860 prior to emitting the light from the emitter.

Figure 9:
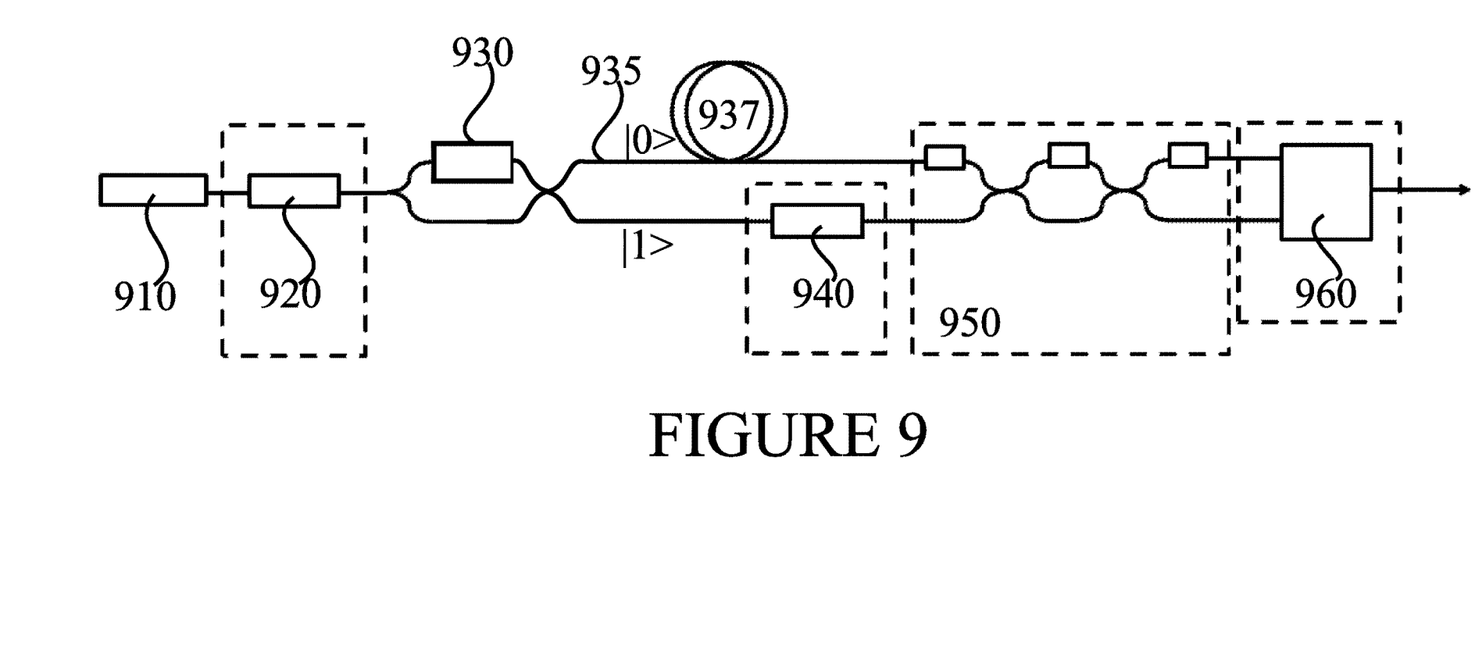
FIG. 9 illustrates an example emitter architecture supporting time bin encoding in accordance with at least some embodiments of the present invention.

FIG. 9 illustrates an example emitter architecture supporting time bin encoding. A light source 910 provides light to pulse modulator 920. Pulse modulator 920, or a pulse modulating stage in which it is comprised, may further be configured to provide at least one of variable attenuation and phase randomization. Amplitude encoder 930 provides qubit |0> and |1> relative amplitude encoding, subsequent to which the light is split simultaneously to a state |0> arm 935, and to a state |1> arm which comprises a qubit |0> and |1> relative phase encoder 940. The state |0> arm is optically coupled to a first dual rail encoder rail via delay line 937, and the state |1> arm is optically coupled to a second dual rail encoder rail. Dual rail encoder 950 may function to pre-compensate for polarization rotation, as laid out above. Dual rail encoder 950 may have similar structure as dual rail encoder 860. Before emitting the light, it is converted from dual rail form to polarization encoded form by PRC 960.

Figure 10A:
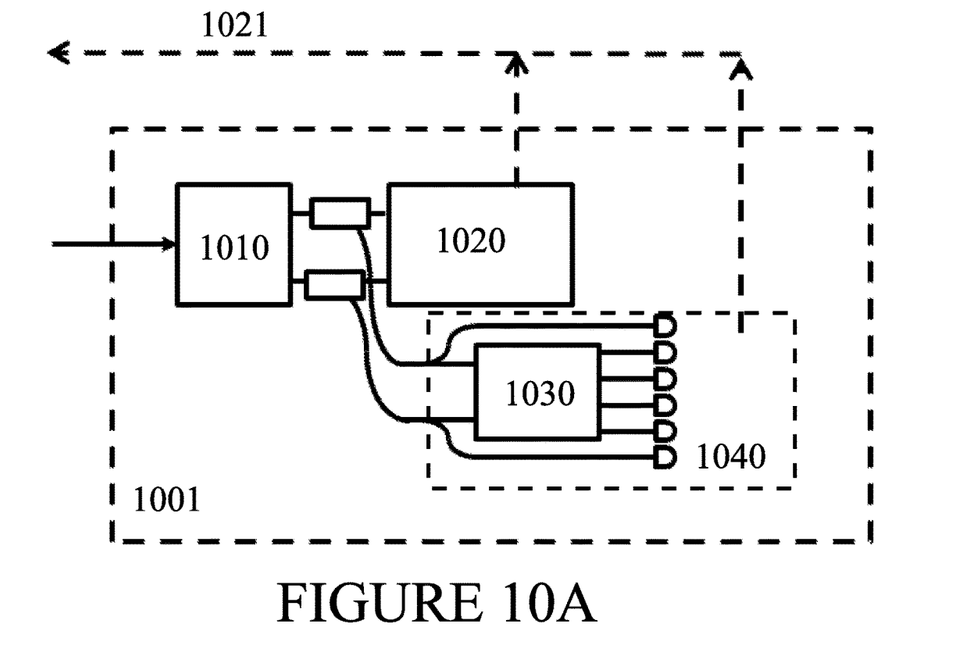
FIG. 10A illustrates an example receiver implementation in accordance with at least some embodiments of the present invention.

FIG. 10A illustrates an example receiver implementation. This receiver may be usable in implementations that employ polarization multiplexing. Here polarization is different for a QKD signal and a reference signal, or polarization is different for |0> and |1>. Receiver 1001 is arranged to receive light to polarization splitter rotator, PSR, 1010, which converts the incoming polarization encoded light to dual rail light. This may comprise, for example, splitting the polarization and rotating one of them to obtain the dual rail light. The dual rail light is conveyed over two rails, or waveguides, to QKD receiver 1020, which is arranged to detect a bit pattern phase-encoded into the light. On each rail connecting PSR 1010 to QKD receiver 1020 there may be disposed a coupler or switch, coupled to convey part of the incoming dual rail light to an optional dual rail state analyser 1040. The dual rail state analyser 1040, where present, may comprise a 90 degree hybrid 1030 and a plurality of detectors denoted in FIG. 10A with symbols resembling the letter "D". At least one of QKD receiver 1020 and optional dual rail state analyser 1040 may be configured to determine feedback data 1021 to be transmitted back to the emitter, to thereby enable performing pre-compensation for polarization rotation that incurs in a transmission medium interconnecting the emitter and the receiver. An example of such a medium is a single mode optical fibre.

Figure 10B:
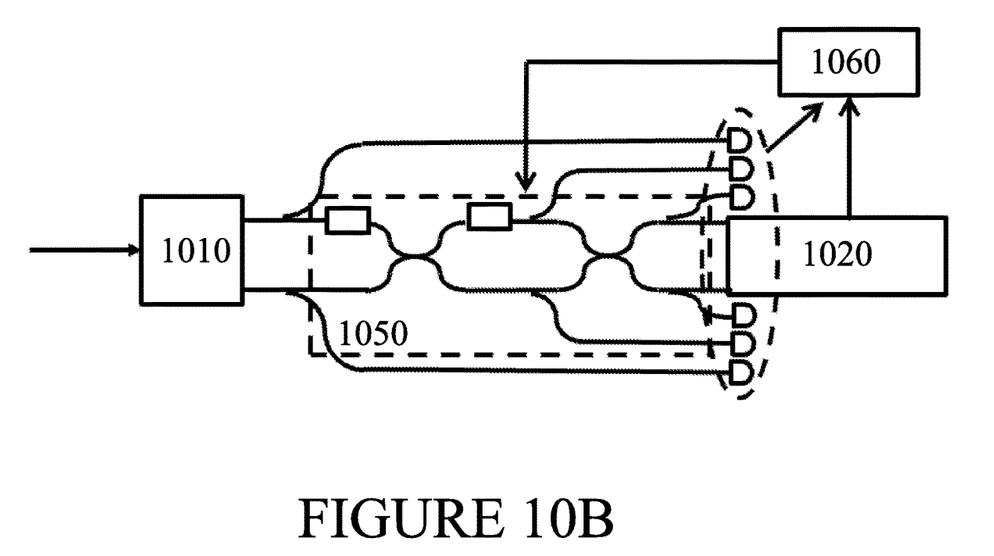
FIG. 10B illustrates an example receiver implementation in accordance with at least some embodiments of the present invention.

FIG. 10B illustrates an example receiver implementation. The implementation of FIG. 10B has post-compensation of polarization rotation instead of pre-compensation in the emitter side. As in the architecture of FIG. 10A, reference sign 1010 denotes a PSR and 1020 denotes a QKD detector. In the FIG. 10B architecture, a dual rail encoder 1050 is disposed between PSR 1010 and QKD detector 1020, and is arranged to compensate for polarization rotation in a medium used to convey light from the emitter to the receiver illustrated in FIG. 10B. The compensation in dual rail encoder 1050 may be effected based on a control signal received from controller 1060, wherein controller 1060 may be configured to generate the control signal based on input from QKD detector 1020 and, optionally, auxiliary detectors "D" that may be arranged to receive light that bypasses dual rail encoder 1050 in whole or in part, as illustrated in the figure. Controller 1060 may be configured to derive the control signal by optimizing the performance of QKD detector 1020. Using the auxiliary detectors, a more complete understanding of the dual-rail state of the light may be obtained, enabling controller 1060 to generate a control signal that, when acted on by dual rail encoder 1050, accomplishes a more efficient compensation for polarization rotation before the light is fed into QKD detector 1020.

Controller 1060 may comprise, for example, a single- or multi-core processor wherein a single-core processor comprises one processing core and a multi-core processor comprises more than one processing core. Controller 1060 may comprise more than one processor. A processing core may comprise, for example, a Cortex-A8 processing core manufactured by ARM Holdings or a Steamroller processing core produced by Advanced Micro Devices Corporation. Controller 1060 may comprise at least one Qualcomm Snapdragon and/or Intel Atom processor. Controller 1060 may comprise at least one application-specific integrated circuit, ASIC. Controller 1060 may comprise at least one field-programmable gate array, FPGA.

Figure 11:
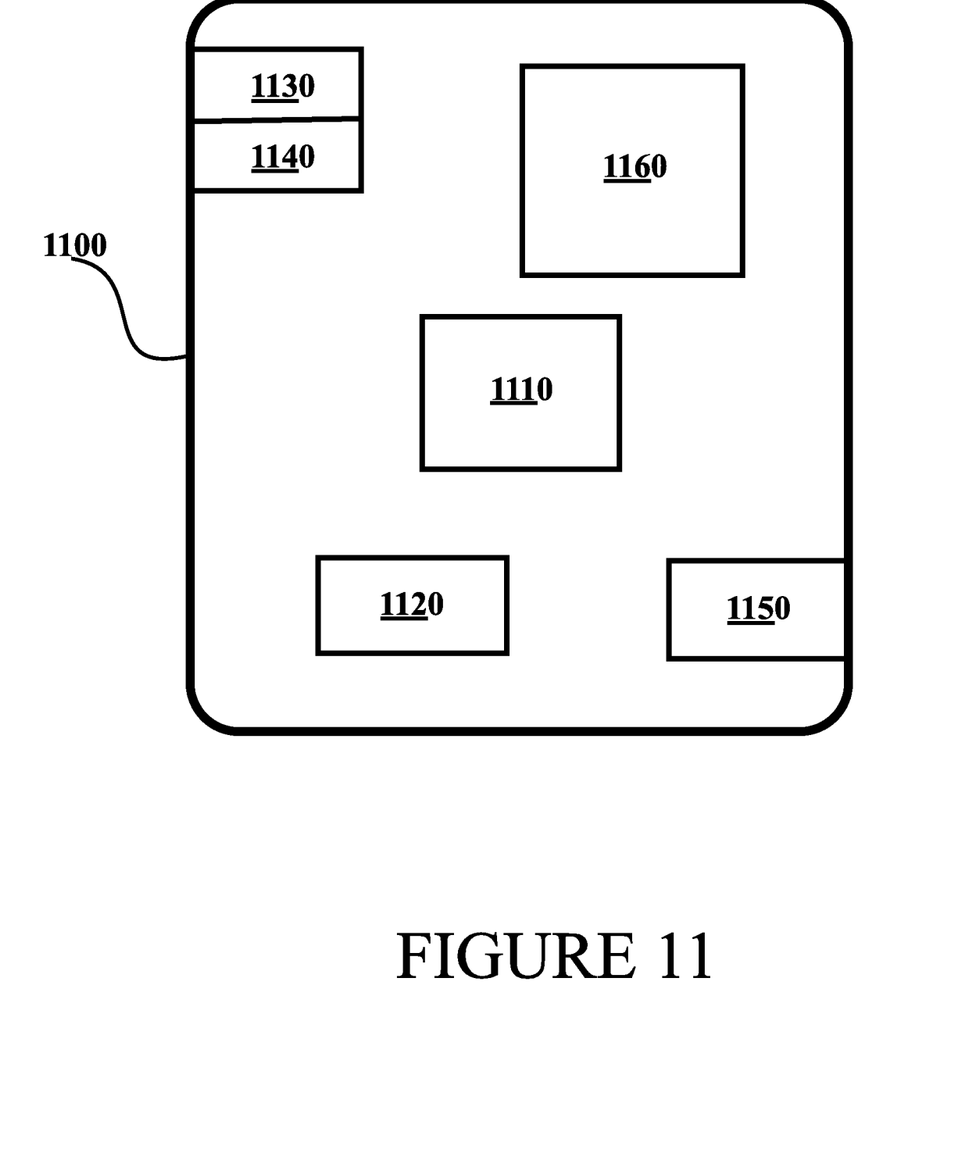
FIG. 11 illustrates an example apparatus capable of supporting at least some embodiments of the present invention.

FIG. 11 illustrates an example apparatus capable of supporting at least some embodiments of the present invention. Illustrated is device 1100, which may comprise, for example, an emitter or receiver or a controller thereof. Comprised in device 1100 is processor 1110, which may comprise, for example, a single- or multi-core processor wherein a single-core processor comprises one processing core and a multi-core processor comprises more than one processing core. Processor 1110 may comprise more than one processor. A processing core may comprise, for example, a Cortex-A8 processing core manufactured by ARM Holdings or a Steamroller processing core produced by Advanced Micro Devices Corporation. Processor 1110 may comprise at least one Qualcomm Snapdragon and/or Intel Atom processor. Processor 1110 may comprise at least one application-specific integrated circuit, ASIC. Processor 1110 may comprise at least one field-programmable gate array, FPGA. Processor 1110 may be means for performing method steps in device 300. Processor 1110 may be configured, at least in part by computer instructions, to perform actions.

Device 1100 may comprise memory 1120. Memory 1120 may comprise random-access memory and/or permanent memory. Memory 1120 may comprise at least one RAM chip. Memory 1120 may comprise solid-state, magnetic, optical and/or holographic memory, for example. Memory 1120 may be at least in part accessible to processor 1110. Memory 1120 may be at least in part comprised in processor 1110. Memory 1120 may be means for storing information. Memory 1120 may comprise computer instructions that processor 1110 is configured to execute. When computer instructions configured to cause processor 1110 to perform certain actions are stored in memory 1120, and device 1100 overall is configured to run under the direction of processor 1110 using computer instructions from memory 1120, processor 1110 and/or its at least one processing core may be considered to be configured to perform said certain actions. Memory 1120 may be at least in part comprised in processor 1110. Memory 1120 may be at least in part external to device 1100 but accessible to device 1100.

Device 1100 may comprise a transmitter 1130. Device 1100 may comprise a receiver 1140. Transmitter 1130 and receiver 1140 may be configured to transmit and receive, respectively, information in accordance with at least one standard. Transmitter 1130 may comprise more than one transmitter. Receiver 1140 may comprise more than one receiver. Device 300 may comprise an optical transceiver 1150. Optical transceiver 1150 may support at least one optical technology, such as a low-intensity optical communication technology.

Device 1100 may comprise user interface, UI, 1160. UI 1160 may comprise at least one of a display, a keyboard, a touchscreen, a vibrator arranged to signal to a user by causing device 1100 to vibrate, a speaker and a microphone. A user may be able to operate device 1100 via UI 1160.

Processor 1110 may be furnished with a transmitter arranged to output information from processor 1110, via electrical leads internal to device 1100, to other devices comprised in device 1100. Such a transmitter may comprise a serial bus transmitter arranged to, for example, output information via at least one electrical lead to memory 1120 for storage therein. Alternatively to a serial bus, the transmitter may comprise a parallel bus transmitter. Likewise processor 1110 may comprise a receiver arranged to receive information in processor 1110, via electrical leads internal to device 1100, from other devices comprised in device 1100. Such a receiver may comprise a serial bus receiver arranged to, for example, receive information via at least one electrical lead from receiver 1140 for processing in processor 1110. Alternatively to a serial bus, the receiver may comprise a parallel bus receiver.

Device 1100 may comprise further devices not illustrated in FIG. 3. In some embodiments, device 1100 lacks at least one device described above.

Processor 1110, memory 1120, transmitter 1130, receiver 1140, NFC transceiver 1150, UI 1160 and/or user identity module 1170 may be interconnected by electrical leads internal to device 1100 in a multitude of different ways. For example, each of the aforementioned devices may be separately connected to a master bus internal to device 1100, to allow for the devices to exchange information. However, as the skilled person will appreciate, this is only one example and depending on the embodiment various ways of interconnecting at least two of the aforementioned devices may be selected without departing from the scope of the present invention.

Figure 12:
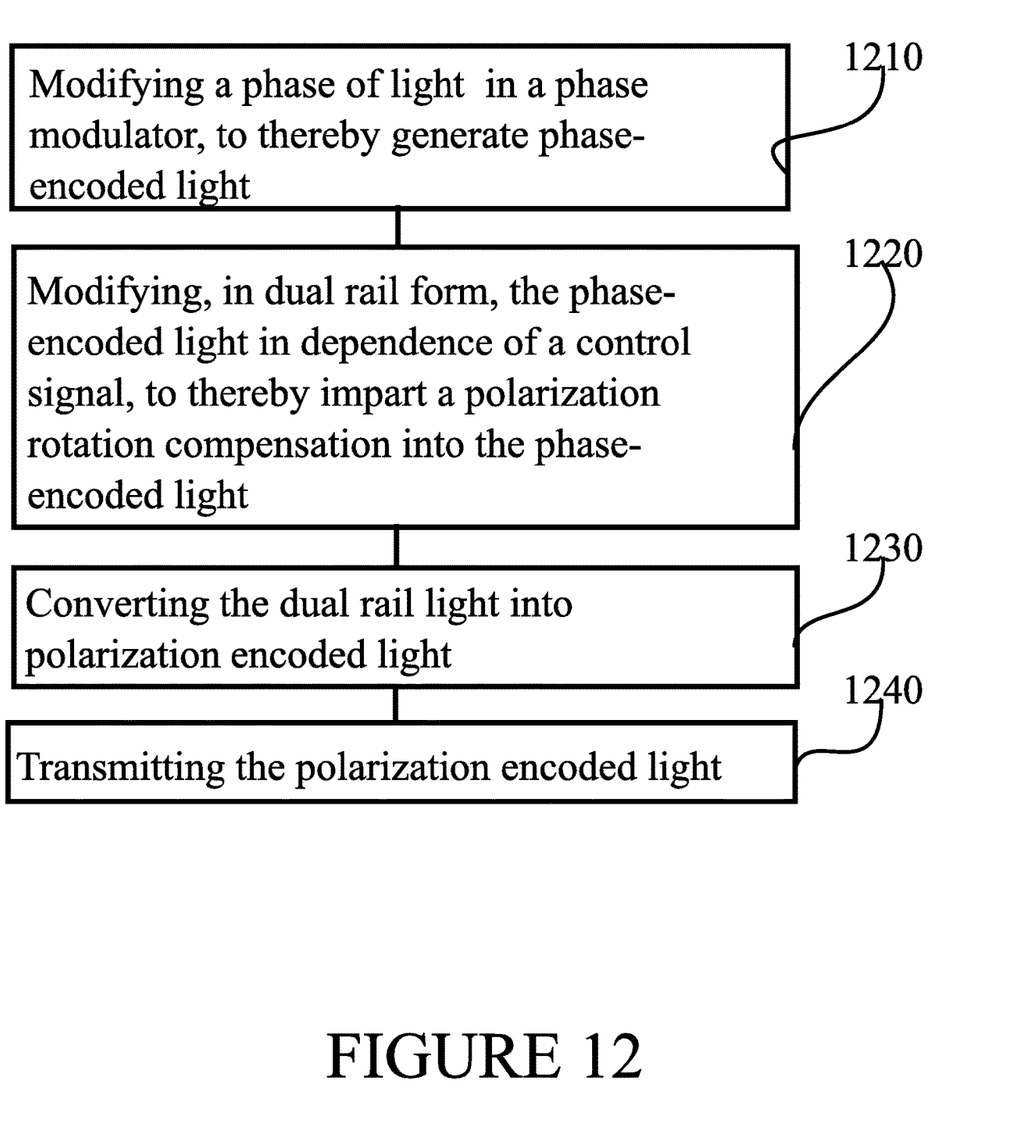
FIG. 12 is a first flow graph of a first method in accordance with at least some embodiments of the present invention.

FIG. 12 is a first flow graph of a first method in accordance with at least some embodiments of the present invention. The illustrated method may be performed in an emitter, for example, or in a control device configured to control the functioning of an emitter.

Phase 1210 comprises modifying a phase of light in a phase modulator, to generate phase-encoded light. Phase 1220 comprises modifying, in dual rail form, the phase-encoded light in dependence of a control signal, to thereby impart a polarization rotation compensation into the phase-encoded light. Phase 1220 may take place in a dual rail encoder, for example. Phase 1230 comprises converting the dual rail light into polarization encoded light. Finally, phase 1240 comprises transmitting the polarization encoded light.

Figure 13:
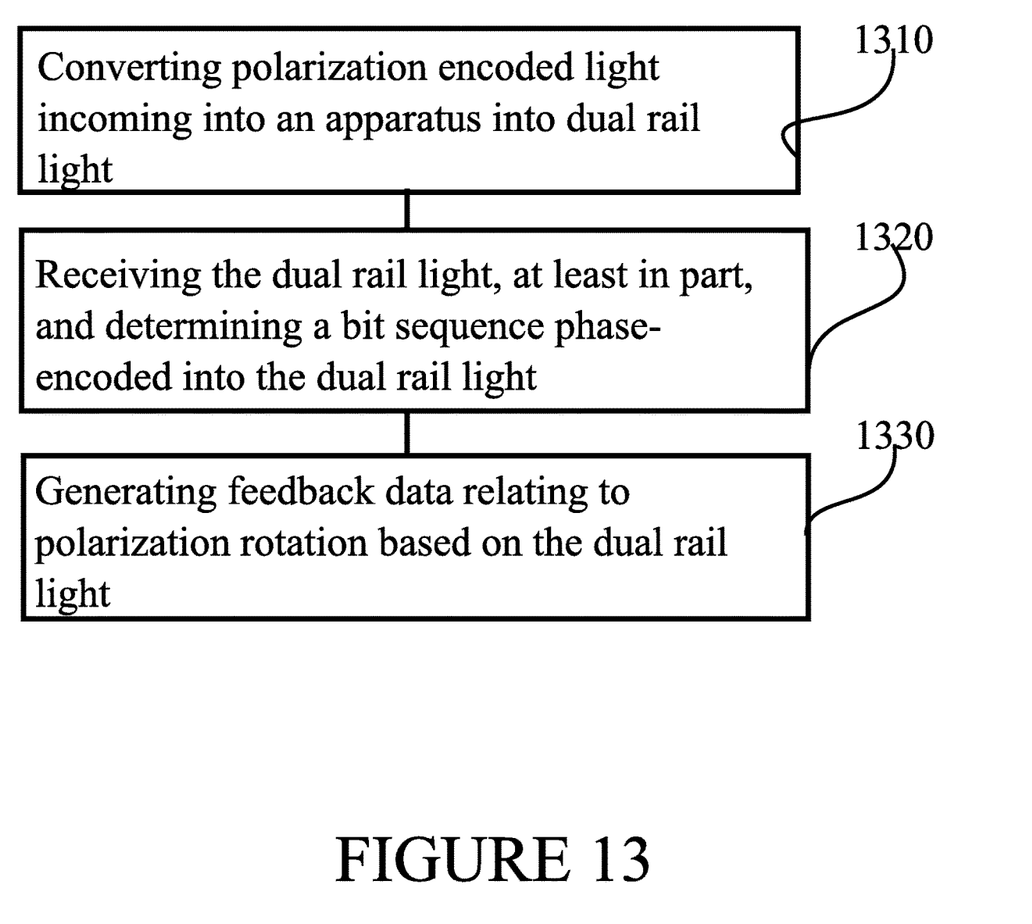
FIG. 13 is a second flow graph of a second method in accordance with at least some embodiments of the present invention.

FIG. 13 is a second flow graph of a second method in accordance with at least some embodiments of the present invention. The illustrated method may be performed in a receiver, for example, or in a control device configured to control the functioning of a receiver.

Phase 1310 comprises converting polarization encoded light incoming into an apparatus into dual rail light. Phase 1320 comprises receiving the dual rail light, at least in part, and determining a bit sequence phase encoded into the dual rail light. Finally, phase 1330 comprises generating feedback data relating to polarization rotation based on the dual rail light.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optical communication.

ACRONYMS LIST

BB84 QKD protocol developed by Bennett and Brassard, in 1984.
COW QKD protocol, coherent one-way, by Gisin
CV-QKD QKD protocol, continuous-variable type
DPS QKD protocol, differential phase shift, by Yamamoto
InP indium phosphide
PBS polarization beam splitter
PRC polarization rotator combiner
PSR polarization splitter rotator
MZI Mach-Zehnder interferometer
SARGO4 QKD protocol based on BB84, by Scarani et. al, 2004.
SoI silicon-on-insulator
QKD quantum key distribution

The invention claimed is:

1. An apparatus for optical communication and quantum key distribution comprising:
a phase modulator configured to modify a phase of light incoming into the phase modulator to generate phase-encoded light;
a dual rail encoder configured to modify the phase-encoded light from the phase modulator in dependence on a control signal based on feedback data relating to polarization rotation from a receiver, thereby imparting a polarization rotation compensation into the phase-encoded light; and
a polarization rotator combiner coupled to the dual rail encoder, the polarization rotator combiner being configured to convert dual rail light from the dual rail encoder into polarization encoded light,
wherein the apparatus is arranged to transmit the polarization encoded light to the receiver.

2. The apparatus according to claim 1, wherein the phase modulator is further configured to modify an amplitude of light incoming into the phase modulator.

3. The apparatus according to claim 1, further comprising:
an attenuator configured to attenuate at least one of the phase-encoded light, the dual rail light and the polarization encoded light.

4. The apparatus according to claim 1, further comprising:
a controller configured to receive the feedback data from the receiver, and to generate the control signal at least in part in dependence on the feedback data.

5. The apparatus according to claim 1, further comprising:
a pulse modulator configured to pulse modulate light and to provide, directly or indirectly, pulse modulated light into the phase modulator,
wherein the dual rail encoder is configured to receive the phase encoded light onto a first rail of the dual rail encoder and a reference signal onto a second rail of the dual rail encoder.

6. The apparatus according to claim 5, further comprising:
a switch configured to provide time multiplexing by alternatingly providing light from the pulse modulator to the second rail of the dual rail encoder and to the phase modulator.

7. The apparatus according to claim 5 further comprising:
a delay line arranged to provide time multiplexing by delaying progression of light from the pulse modulator toward the second rail of the dual rail encoder.

8. The apparatus according to claim 1, further comprising:
a switch configured to provide polarization multiplexing by alternatingly providing pulse modulated light from a pulse modulator to the phase modulator and to a second phase modulator, the phase modulator corresponding to state |1> and being coupled to provide its output to a first rail of the dual rail encoder and the second phase modulator corresponding to state |0> and being coupled to provide its output to a second rail of the dual rail encoder.

9. The apparatus according to claim 1, further comprising:
a qubit |0> and |1> relative amplitude encoder and a delay line configured to provide polarization multiplexing by delaying progression of pulse modulated light from a pulse modulator toward a second rail of the dual rail encoder, corresponding to state |0>,
wherein the phase modulator corresponds to state |1> and is coupled to provide its output to a first rail of the dual rail encoder.

10. An apparatus for optical communication and quantum key distribution comprising:
a polarization splitter rotator configured to convert polarization encoded light incoming into the apparatus into dual rail light, and
an optical receiver configured to receive the dual rail light, at least in part, and to determine a bit sequence phase encoded into the dual rail light,
wherein the optical receiver is configured to generate and to send feedback data relating to polarization rotation based on the dual rail light to a dual rail encoder disposed in one of an emitter or the apparatus and arranged to impart a polarization rotation compensation.

11. The apparatus according to claim 10 further comprising:
a dual rail state analyser configured to generate feedback data relating to polarization rotation based on the dual rail light to a dual rail encoder,
wherein the dual rail state analyser is coupled to receive a first part of the dual rail light and the optical receiver is arranged to receive a second part of the dual rail light.

12. The apparatus according to claim 10, further comprising:
    a dual rail encoder between the polarization splitter rotator and the optical receiver and arranged to impart a polarization rotation compensation onto the dual rail light generated by the dual rail encoder in dependence of the feedback data originating in the optical receiver.

13. The apparatus according to claim 12, further comprising:
    at least one optical waveguide arranged to convey dual rail light from the polarization splitter rotator, bypassing the dual rail encoder, to at least one auxiliary detector thereby to enable modification of the feedback data.

14. A method for optical communication and quantum key distribution comprising:
    modifying a phase of light in a phase modulator to generate phase-encoded light;
    modifying, in dual rail form, the phase-encoded light from the phase modulator in dependence on a control signal based on feedback data relating to polarization rotation from a receiver, thereby imparting a polarization rotation compensation into the phase-encoded light;
    converting the dual rail light into polarization encoded light; and
    transmitting the polarization encoded light to the receiver.

15. The method according to claim 14, further comprising:
    modifying an amplitude of light incoming into the phase modulator.

16. The method according to claim 14, further comprising:
    attenuating at least one of the phase-encoded light, the dual rail light and the polarization encoded light.

17. The method according to claim 14, further comprising:
    receiving feedback data from a receiver, and generating the control signal at least in part in dependence of the feedback data.

18. The method according to claim 14, further comprising:
    pulse modulating light and providing, directly or indirectly, pulse modulated light into the phase modulator; and
    receiving the phase encoded light onto a first rail of the dual rail encoder and receiving a reference signal onto a second rail of the dual rail encoder.

19. A method for optical communication and quantum key distribution comprising:
    converting polarization encoded light incoming into an apparatus into dual rail light;
    receiving the dual rail light, at least in part, and determining a bit sequence phase encoded into the dual rail light; and
    generating and sending feedback data relating to polarization rotation based on the dual rail light to a dual rail encoder disposed in one of an emitter or the apparatus and arranged to impart a polarization rotation compensation.

20. A non-transitory computer readable medium having stored thereon a set of computer readable instructions for optical communication and quantum key distribution that, when executed by at least one processor, cause an apparatus to at least:
    modify a phase of light in a phase modulator to generate phase-encoded light;
    modify, in dual rail form, the phase-encoded light from the phase modulator in dependence on a control signal based on feedback data relating to polarization rotation from a receiver, thereby imparting a polarization rotation compensation into the phase-encoded light and to obtain dual rail light from the phase-encoded light;
    convert the dual rail light into polarization encoded light; and
    transmit the polarization encoded light to the receiver.

* * * * *